Figure 1:
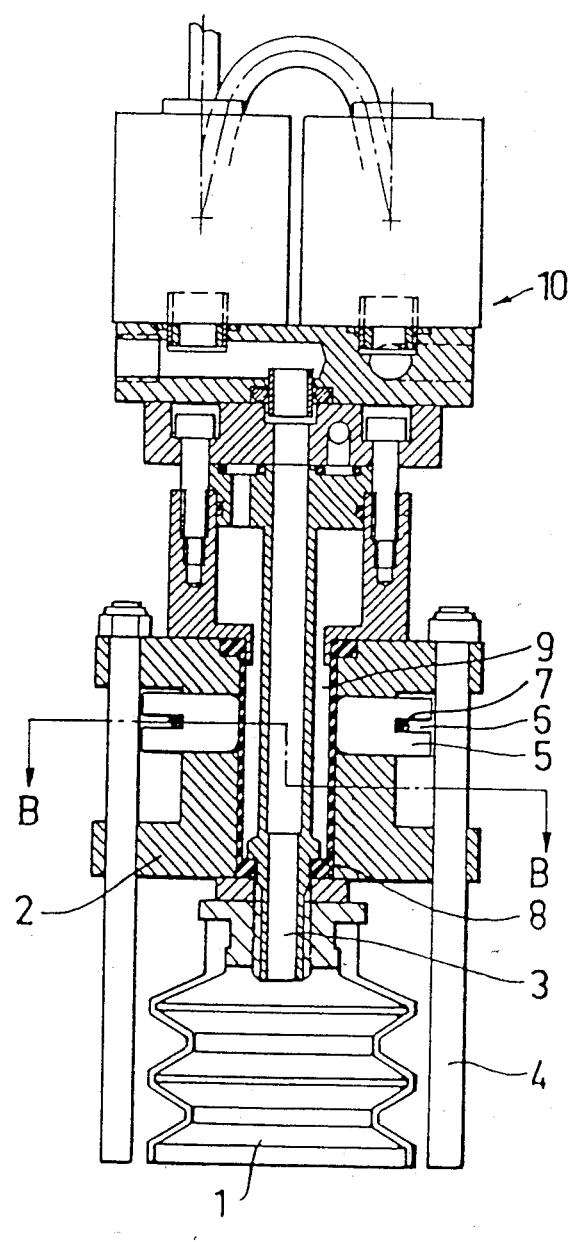

United States Patent [19]

Lundin

[11] Patent Number: 4,558,755
[45] Date of Patent: Dec. 17, 1985

[54] FOOD HANDLING DEVICE

[76] Inventor: Bengt A. G. Lundin, Box 2265, S-600 02 Norrköping, Sweden

[21] Appl. No.: 658,246

[22] Filed: Oct. 5, 1984

[30] Foreign Application Priority Data

Oct. 5, 1983 [SE] Sweden .................................. 8305479

[51] Int. Cl.⁴ .......................... G01G 19/14; B66C 1/02
[52] U.S. Cl. ..................................... 177/147; 294/64.1
[58] Field of Search ......................... 177/147; 294/64.1

[56] References Cited

U.S. PATENT DOCUMENTS

| | | | |
|---|---|---|---|
| 3,390,732 | 7/1968 | McMackin | 177/147 X |
| 3,580,221 | 5/1971 | Noyes | 294/64.1 X |
| 3,955,843 | 5/1976 | Ottenhues et al. | 294/64.1 |

Primary Examiner—George H. Miller, Jr.
Attorney, Agent, or Firm—Cushman, Darby & Cushman

[57] ABSTRACT

Holding device for food in particular intended for use together with a load sensing cell in packing machines for food. The food is weighed before it is included in a package so that the price tag can be placed on a film (lid) already before this is sealed over the food. The holding device includes a suction means (1) and round this arranged contact pins (4). The contact pins are axially adjustable so that when the holding device is brought to contact with the food these adjust to the shape of the food. When or before a vacuum is fed to the suction means (1) a cylinder shaped rubber membrane (8) act on pistons (5) radially arranged that press against the contact pins (4) locking these from a movement. In this manner the food is firmly and ridgedly held, which in turn is necessary for the weighing of the product and secondly for enabling the replaceing of this without problems in identically the same position as it was removed from the bottom part of the package.

8 Claims, 2 Drawing Figures

FOOD HANDLING DEVICE

This invention is related to a device ridgedly holding, handling and lifting pieces of food with irregular and from piece to piece differing shape.

Whith the increasing automaticizing of the handling of food an increasing need for holding handling and lifting pieces of food has been experienced. It is however not only necessary to hold and lift the food, but it is also necessary in many application that the food is held and lifted with a ridgedly retained orientation relative the lifting device. This is of great importance when lifting food in order to weigh. Even a slight swinging on part of the food will result in faulty readings and it is furthermore desired that the food is replaced in exact the same position as it was lifted in some instances. This problem can perhaps be solved by using known technique if the pieces of food that is handled or lifted is identical. This is however seldom the case and the pieces of food that have to be handled have not only irregular shape but vary also from piece to piece, which renders previously used solutions unsatisfactory, since the food wall may be lifted but easily turns one way and the other. Resulting in swinging or an alteration of the position when it is replaced.

The object of the invention is to provide a device solving the above problems in a relatively simple and robust manner. In accordance with the invention this object is achieved by having the device including flexible suction means and axially moveable contact pins and locking means for these contact pins.

When used the device in accordance with the invention is brought close to the piece of food that is to be held or lifted and in this position the contact pins are free to move longitudinally and they as well as the suction means adjust to shape of the piece of food. Then the locking means lock the contact pins and vacuum is fed to the suction means resulting in that the suction means hold the piece of food against the contact pins. Since the contact pins have adjusted to the shape of the body the force excerted by the suction means will only result in a force against the pins and no turning or angling will take place. In this simple manner a very fast, very stable and very ridged holding of the food is obtained and it is thus possible to lift the food a short distance so that it becomes free from for instance the bottom half of a packing and then to replace the goods after very short time. The short time in which the weighing can take place is greatly dependent on a very firm and ridged holding of the food since even a small swinging or pendulum movement will necessitate waiting before a weight can be registrated.

Due to the firm holding it is possible to arrange the weighing device very close to the lifting device for instance in the shape of a load cell. This is particularily convenient when the food has to be placed rather carefully on with consideration in the package. When this is the case the food is placed by hand in the bottom part of a package, then it is weighed by aid of the invention and then replaced in the bottom part of the package in identically the same position as before. This is important since the following automatic sealing of the package otherwise can be jeopardized. The sealing can also easily automatically be provided with a price tag or label with the calculated price based on the weighing of the food. In this manner it is only the food that is weighed.

The suction means can include several seperate suction hollows preferably each provided with separate suction feed so that if one hollow is rendered inactive by for instance a hole in a cheese on something like that other hollows give sufficient holding force.

Further advantages will be apparent from the following description of an embodiment of the invention, with reference to the drawings. On these FIG. 1 shows a section of a holding device in accordance with the invention and FIG. 2 diagrammatically a packing machine of a known type, which has been provided with a holding device in accordance with the invention in order to enable the weighing of the food.

Figure 2:
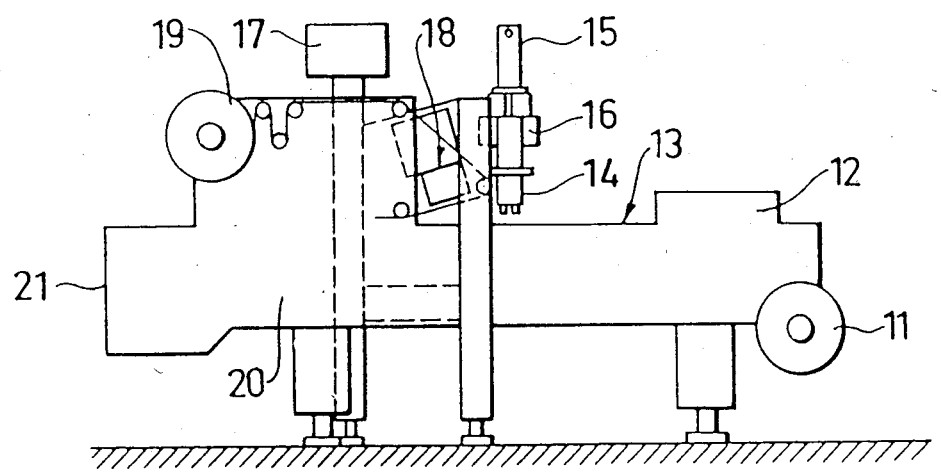

As is apparent from FIG. 1 the holding device in accordance with the invention includes a bellow shaped suction means 1 turned downwards with it's suction on holding opening and with it's upper end fastened to a central body 2 of the holding device. To the suction means 1 a vacuumduct 3 leads. In the central body 2 supporting pins 4 are arranged axially movable around the suction means 1. The connecting pins are adjustable or moveable parallel to the general moving direction of the holding device when this is brought in contact with the piece of food that is to be held that is in FIG. 1 vertically downwards. When brought in contact with the food that is to be lifted the pins adjust to the shape of this. In the main body 2 is further radially arranged radially moveable pistons 5, that at their outer ends can be brought in contact with and against the contact pins 4 in order to lock the position of these. When the holding device according to the invention is brought close to a piece of food that is to be held these pistons 5 are at an inner position freeing the contact pins 4. The pistons are biased towards this position by all pistons being provided with a slot 6 in which one common O-ring 7 has been placed, biasing the pistons towards the centre of the central body 2. Centrally in the central body is further arranged a cylindrical rubber membran 8 against which the pistons 5 with their inner ends are in contact. When the contact pins 4 are to be locked before the lifting of the food pressurized air is fed to the space 9 inside of the rubber membran and the rubber membran expand pushing the pistons 5 outwards against the contact pins and those are locked. The central body 2 for the holding device is connected to an upper part 10 including a load sensing cell, that is hydraulically damped so that the holding device with a very great accuracy can be used to weigh the food that is lifted. The holding device according to the invention is further connected to an air cylinder giving the holding device its movement up and down.

It should be noted that a more or less common feed of pressurized air can be used to the piston manevering membran 8 as well as to the air cylinder. Furthermore by the use of ejector means (suction jet) for providing vacuum to the suction means 1 also this feed of pressurized air can be more or less simultaneous with the feed to the membran 8. On the drawing only two contact pins 4 are shown but these should be least be three and are suitably more and due to the simple structure it is very easy to arrange a number of contact pins around the suction means 1 and should trouble arise with arrangeing a sufficient number of locking pistons 5 these can easily be arranged in slightly different planes.

In the shown embodiment the force bringing the contact pins in contact with the food is their own weight and the suction means adjust to the shape due to it's resilience, of course however the contact pins as well as the suction means can be biased against the food relative the central body by additional means.

In FIG. 2 it is shown how the holding device according to the invention is used in a packing machine of a known type. This includes in the shown embodiment a first roll 11 of film, from which the film is drawn to a station 12 in which the bottom parts of the packages are made by means of vacuum shaping. At 13 the food is placed in shaped bottom part and the food is then together with the bottom parts of the packages step-wise forwarded to the holding device 14 in accordance with the invention.

The holding device according to the invention is connected to an air cylindre 15. Between the air cylindre 15 and the holding and lifting device in accordance with the invention a load cell 16 is arranged and the air cylindre is in its turn fastened to a free standing support.

When the food has reached the holding device this lifts the food up above the package bottom, the weight is registered by the load cell and the holding device and air cylindre replaces the food in the exact original position. At the same time a micro dator 17 recalculates the weight into a price and then controls a thermo printer 18 to write a price label, which also can be provided with an AEN-code that is fastened to a film 19 constituting the upper side or seal (lid) of the package. The packages are then evacuated and the two films are welded together at a station 20, whereafter the food leaves the machine at 21 priced and packed.

The invention thus in this case enables a simple weighing and price labeling of food at a known packing machine without interfering with the function of the packing machine.

I claim:

1. Device for ridgedly holding, handling and lifting pieces of food with irregular and differing shape, characterized in that it includes flexible suction means and around these parallel contact pins and locking means for these contact pins, so that when used at first the contact pins and the suction means adjust to the shape of the piece of food, then the contact pins are locked in their positions and the suctions means are activated to draw and hold the piece of food against the contact pins firmly and preventing movement between the device and the piece of food.

2. Device in accordance to claim 1, characterized in that the locking means for the contact means includes radially arranged pistons or push rods that can be pressed against pins by common cylindrical membran means when these are subjected to pressurized air on the other side of the membran.

3. Device according to claim 2, characterized in that the controlling pressure to the membran and to vacuum providing ejectors is parallel.

4. Device according to claim 2, characterized in that the pistons are biased from the contact pins towards the centre of the device by an O-ring.

5. Device according to claim 1, characterized in that the suction means include several suction opening each provided with a separated suction feed.

6. Device according to claim 1, characterized in that the device includes a load sensing cell enabling the device to be used for weighing food.

7. Device according to claim 1, characterized in that the contact pins are vertically arranged and that they are biased against the food by their own weight.

8. Device according to claim 1, characterized in that the suction means are biased against the food by it's own weight and resiliency.

* * * * *